US012686282B2

(12) United States Patent
Woodland et al.

(10) Patent No.: US 12,686,282 B2
(45) Date of Patent: Jul. 21, 2026

(54) VEHICLE AND CORRESPONDING REGENERATIVE BRAKING CONTROL SYSTEM

(71) Applicant: FORD GLOBAL TECHNOLOGIES, LLC, Dearborn, MI (US)

(72) Inventors: Brandon Jay Woodland, Livonia, MI (US); Sergey Gennadievich Semenov, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 330 days.

(21) Appl. No.: 18/325,510

(22) Filed: May 30, 2023

(65) Prior Publication Data

US 2024/0399879 A1 Dec. 5, 2024

(51) Int. Cl.
B60L 7/26 (2006.01)
B60T 13/58 (2006.01)

(52) U.S. Cl.
CPC .............. B60L 7/26 (2013.01); B60T 13/586 (2013.01); *B60L 2240/12* (2013.01); *B60L 2240/423* (2013.01); *B60L 2240/642* (2013.01); *B60L 2250/26* (2013.01); *B60T 2270/604* (2013.01)

(58) Field of Classification Search
CPC . B60W 30/18127; B60L 7/26; B60L 15/2009; B60T 1/10; B60T 13/586; B60T 2270/604
See application file for complete search history.

(56) References Cited

U.S. PATENT DOCUMENTS

| | | | | |
|---|---|---|---|---|
| 5,905,349 | A | * | 5/1999 | Farkas ...................... B60L 7/18 318/432 |
| 6,278,916 | B1 | * | 8/2001 | Crombez .................. B60L 7/26 701/84 |
| 6,574,535 | B1 | * | 6/2003 | Morris ..................... B60K 6/44 180/65.6 |
| 8,155,814 | B2 | | 4/2012 | Tamai et al. |
| 9,340,199 | B1 | * | 5/2016 | Nefcy .................. B60W 20/00 |
| 9,669,835 | B2 | | 6/2017 | Kim et al. |
| 10,071,724 | B2 | | 9/2018 | Zhao et al. |
| 10,960,883 | B2 | | 3/2021 | Tamai et al. |
| 11,130,403 | B1 | * | 9/2021 | Woodland ................ B60T 1/10 |

(Continued)

FOREIGN PATENT DOCUMENTS

| | | | |
|---|---|---|---|
| EP | 2055580 | A2 | 5/2009 |
| JP | 2012091581 | A * | 5/2012 |

*Primary Examiner* — David A Testardi
(74) *Attorney, Agent, or Firm* — David Kelley; Brooks Kushman P.C.

(57) ABSTRACT

A vehicle includes an electric machine, friction brakes, a brake pedal, and a controller. The controller is programmed to, in response to depressing the brake pedal to generate a first command to reduce the speed of the vehicle, reduce the speed of the vehicle (i) via regenerative braking or (ii) via regenerative braking plus friction braking. The controller is further programmed to, in response to (i) releasing the brake pedal subsequent to the first command, (ii) the speed of the vehicle being less than a threshold, and (iii) depressing the brake pedal to generate a second command to reduce the speed of the vehicle subsequent to releasing the brake pedal, reduce the speed of the vehicle via friction braking only.

18 Claims, 3 Drawing Sheets

(56) References Cited

U.S. PATENT DOCUMENTS

| | | | |
|---|---|---|---|
| 2001/0024062 A1* | 9/2001 | Yoshino | B60W 10/18 |
| | | | 903/917 |
| 2009/0118886 A1* | 5/2009 | Tamai | B60W 20/11 |
| | | | 701/22 |
| 2009/0118887 A1* | 5/2009 | Minarcin | B60K 6/365 |
| | | | 701/22 |
| 2009/0118888 A1* | 5/2009 | Minarcin | B60W 10/08 |
| | | | 701/22 |
| 2010/0235043 A1* | 9/2010 | Seta | B60L 3/0076 |
| | | | 701/29.2 |
| 2013/0017928 A1* | 1/2013 | Oh | B60W 10/182 |
| | | | 477/203 |
| 2013/0173127 A1* | 7/2013 | Nakatsu | B60L 7/14 |
| | | | 701/70 |
| 2014/0024495 A1* | 1/2014 | Kim | B60W 10/06 |
| | | | 477/167 |
| 2014/0172211 A1* | 6/2014 | Kim | B60L 58/12 |
| | | | 701/22 |
| 2014/0207355 A1* | 7/2014 | Akaho | B60L 3/108 |
| | | | 701/70 |
| 2015/0019058 A1* | 1/2015 | Georgiev | B60L 58/12 |
| | | | 701/22 |
| 2015/0066266 A1* | 3/2015 | Aldrich, III | B60W 10/196 |
| | | | 180/65.265 |
| 2015/0202964 A1* | 7/2015 | Nefcy | B60W 10/08 |
| | | | 701/70 |
| 2015/0202965 A1 | 7/2015 | Gabor et al. | |
| 2015/0203106 A1* | 7/2015 | Zhao | B60L 15/2009 |
| | | | 701/22 |
| 2015/0222209 A1* | 8/2015 | Crisp | B60W 30/18127 |
| | | | 318/376 |
| 2015/0274148 A1* | 10/2015 | Nefcy | B60W 10/30 |
| | | | 477/4 |
| 2016/0137066 A1* | 5/2016 | Nada | B60L 58/30 |
| | | | 701/22 |
| 2017/0137031 A1* | 5/2017 | Yamaguchi | B60L 15/2009 |
| 2017/0259670 A1* | 9/2017 | Kuang | B60L 7/18 |
| 2018/0093571 A1* | 4/2018 | Hall | B60L 7/08 |
| 2018/0134276 A1 | 5/2018 | Zhao et al. | |
| 2018/0312078 A1* | 11/2018 | Message | B60L 15/2063 |
| 2021/0086622 A1* | 3/2021 | Zhang | B60L 7/26 |
| 2022/0097707 A1* | 3/2022 | Semenov | B60T 8/3215 |
| 2023/0256956 A1* | 8/2023 | Oguro | B60L 15/2009 |
| | | | 701/22 |
| 2024/0317050 A1* | 9/2024 | Oh | B60T 1/062 |

* cited by examiner

VEHICLE AND CORRESPONDING REGENERATIVE BRAKING CONTROL SYSTEM

TECHNICAL FIELD

The present disclosure relates to hybrid or electric vehicles and control systems for hybrid or electric vehicles.

BACKGROUND

Hybrid and electric vehicles may include an electric machine that is configured to propel the vehicle or slow the vehicle via regenerative braking.

SUMMARY

A vehicle includes an electric machine, friction brakes, a brake pedal, and a controller. The electric machine is configured to brake the vehicle via regenerative braking. The friction brakes are configured to brake the vehicle via friction braking. The brake pedal is configured to generate commands to reduce a speed of the vehicle via regenerative braking or friction braking. The controller is programmed to, in response to depressing the brake pedal to generate a first command to reduce the speed of the vehicle, reduce the speed of the vehicle (i) via regenerative braking or (ii) via regenerative braking plus friction braking. The controller is further programmed to, in response to (i) releasing the brake pedal subsequent to the first command, (ii) the speed of the vehicle being less than a threshold, and (iii) depressing the brake pedal to generate a second command to reduce the speed of the vehicle subsequent to releasing the brake pedal, reduce the speed of the vehicle via friction braking only.

A vehicle includes an electric machine, friction brakes, and a controller. The electric machine is configured to brake the vehicle via regenerative braking. The friction brakes are configured to brake the vehicle via friction braking. The controller is programmed to, in response to a first command to reduce a speed of the vehicle, reduce the speed of the vehicle (i) via regenerative braking. The controller is further programmed to, in response to (i) an increase in a torque of the electric machine from a first negative value during the first command to a second negative value subsequent to the first command, (ii) the speed of the vehicle being less than a threshold, and (iii) a second command to reduce the speed of the vehicle subsequent to the increase in the torque of the electric machine from the first negative value to the second negative value, limit regenerative braking torque to the second negative value and reduce the speed of the vehicle (i) via friction braking or (ii) via friction braking plus regenerative braking.

A vehicle includes an electric machine, friction brakes, and a controller. The electric machine is configured to brake the vehicle via regenerative braking. The friction brakes are configured to brake the vehicle via friction braking. The controller is programmed to, in response to a first command to reduce a speed of the vehicle, reduce the speed of the vehicle (i) via regenerative braking. The controller is further programmed to, in response to (i) an increase in the torque of the electric machine from a negative value during the first command to a zero or positive value subsequent to the first command, (ii) the speed of the vehicle being less than a threshold, and (iii) a second command to reduce the speed of the vehicle subsequent to the increase in the torque of the electric machine from the negative value to the zero or positive value, control regenerative braking torque to zero and reduce the speed of the vehicle via friction braking only.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
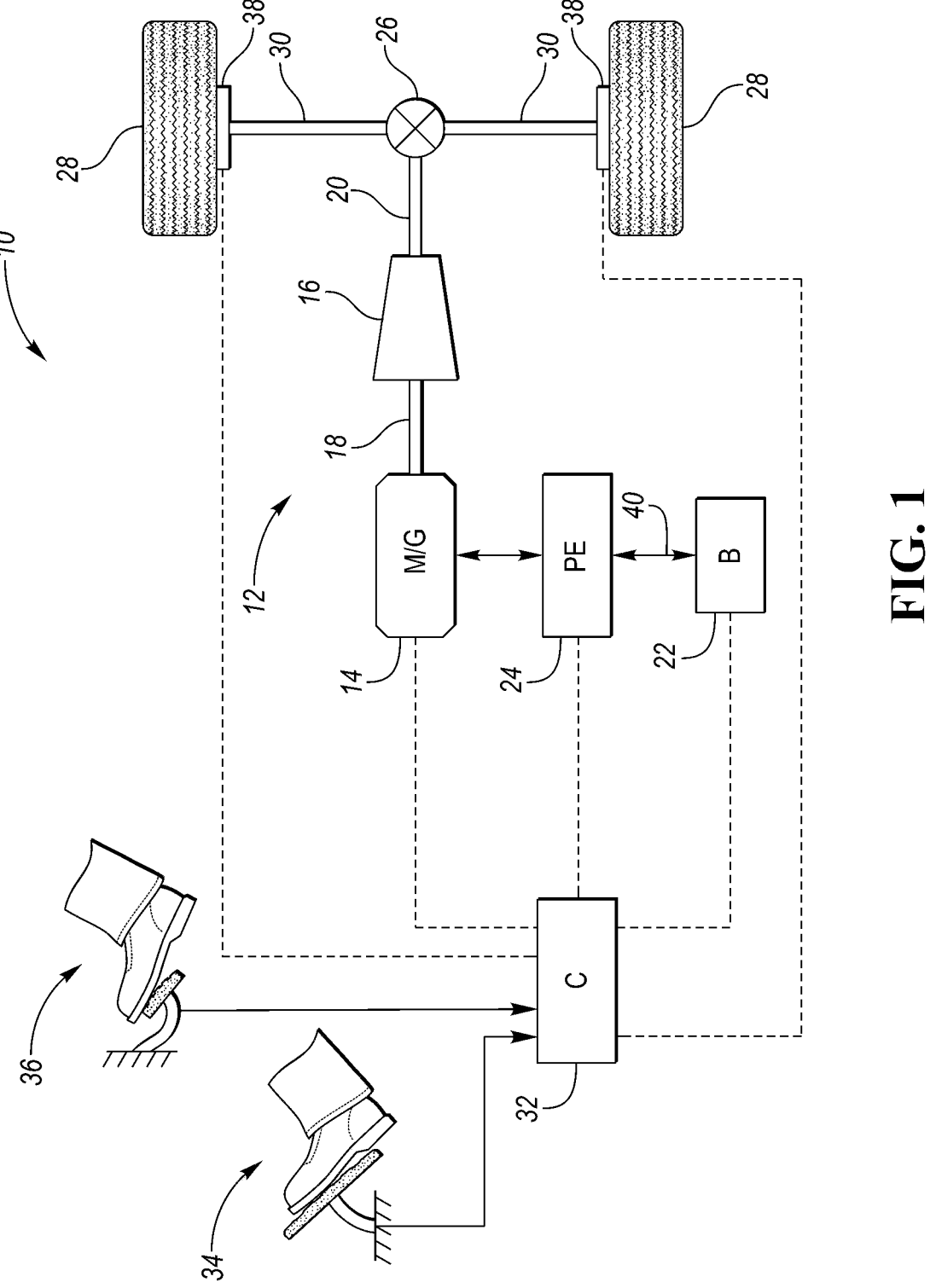
FIG. 1 is a schematic illustration of a representative powertrain of an electric vehicle.

Referring to FIG. 1, a schematic diagram of an electric vehicle 10 is illustrated according to an embodiment of the present disclosure. FIG. 1 illustrates representative relationships among the components. Physical placement and orientation of the components within the vehicle may vary. The electric vehicle 10 includes a powertrain 12. The powertrain 12 includes an electric machine such as an electric motor/generator (M/G) 14 that drives a transmission (or gearbox) 16. More specifically, the M/G 14 may be rotatably connected to an input shaft 18 of the transmission 16. The transmission 16 may be placed in PRNDSL (park, reverse, neutral, drive, sport, low) via a transmission range selector (not shown). The transmission 16 may have a fixed gearing relationship that provides a single gear ratio between the input shaft 18 and an output shaft 20 of the transmission 16. A torque converter (not shown) or a launch clutch (not shown) may be disposed between the M/G 14 and the transmission 16. Alternatively, the transmission 16 may be a multiple step-ratio automatic transmission. An associated traction battery 22 is configured to deliver electrical power to or receive electrical power from the M/G 14.

The M/G 14 is a drive source for the electric vehicle 10 that is configured to propel the electric vehicle 10. The M/G 14 may be implemented by any one of a plurality of types of electric machines. For example, M/G 14 may be a permanent magnet synchronous motor. Power electronics 24 condition direct current (DC) power provided by the battery 22 to the requirements of the M/G 14, as will be described below. For example, the power electronics 24 may provide three phase alternating current (AC) to the M/G 14.

If the transmission 16 is a multiple step-ratio automatic transmission, the transmission 16 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between the transmission output shaft 20 and the transmission input shaft 18. The transmission 16 is automatically shifted from one ratio to another based on various vehicle and ambient operating conditions by an associated controller, such as a powertrain control unit (PCU). Power and torque from the M/G 14 may be delivered to and received by transmission 16. The transmission 16 then provides powertrain output power and torque to output shaft 20.

It should be understood that the hydraulically controlled transmission 16, which may be coupled with a torque converter (not shown), is but one example of a gearbox or transmission arrangement; any multiple ratio gearbox that accepts input torque(s) from a power source (e.g., M/G 14) and then provides torque to an output shaft (e.g., output shaft 20) at the different ratios is acceptable for use with embodiments of the present disclosure. For example, the transmission 16 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 20 is connected to a differential 26. The differential 26 drives a pair of drive wheels 28 via respective axles 30 connected to the differential 26. The differential 26 transmits approximately equal torque to each wheel 28 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 32 such as a powertrain control unit (PCU). While illustrated as one controller, the controller 32 may be part of a larger control system and may be controlled by various other controllers throughout the vehicle 10, such as a vehicle system controller (VSC). It should therefore be understood that the powertrain control unit 32 and one or more other controllers can collectively be referred to as a "controller" that controls various actuators in response to signals from various sensors to control functions such as operating the M/G 14 to provide wheel torque or charge the battery 22, select or schedule transmission shifts, etc. Controller 32 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle.

The controller 32 communicates with various vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 32 may communicate signals to and/or receive signals from the M/G 14, battery 22, transmission 16, power electronics 24, and any another component of the powertrain 12 that may be included, but is not shown in FIG. 1 (i.e., a launch clutch that may be disposed between the M/G 14 and the transmission 16. Although not explicitly illustrated, those of ordinary skill in the art will recognize various functions or components that may be controlled by controller 32 within each of the subsystems identified above. Representative examples of parameters, systems, and/or components that may be directly or indirectly actuated using control logic and/or algorithms executed by the controller 32 include front-end accessory drive (FEAD) components such as an alternator, air conditioning compressor, battery charging or discharging, regenerative braking, M/G 14 operation, clutch pressures for the transmission gearbox 16 or any other clutch that is part of the powertrain 12, and the like. Sensors communicating input through the I/O interface may be used to indicate wheel speeds (WS1, WS2), vehicle speed (VSS), coolant temperature (ECT), accelerator pedal position (PPS), ignition switch position (IGN), ambient air temperature (e.g., ambient air temperature sensor 33), transmission gear, ratio, or mode, transmission oil temperature (TOT), transmission input and output speed, or shift mode (MDE), battery temperature, voltage, current, or state of charge (SOC) for example.

Control logic or functions performed by controller 32 may be represented by flowcharts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for case of illustration and description. The control logic may be implemented primarily in software executed by a microprocessor-based vehicle and/or powertrain controller, such as controller 32. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 34 is used by the driver of the vehicle to provide a demanded torque, power, or drive command to the powertrain 12 (or more specifically M/G 14) to propel the vehicle. In general, depressing and releasing the accelerator pedal 34 generates an accelerator pedal position signal that may be interpreted by the controller 32 as a demand for increased power or decreased power, respectively. A brake pedal 36 is also used by the driver of the vehicle to provide a demanded braking torque to slow the vehicle. In general, depressing the brake pedal 36 generates a brake pedal position signal that may be interpreted by the controller 32 as a demand to decrease or reduce the vehicle speed. Based upon inputs from the accelerator pedal 34 and/or brake pedal 36, the controller 32 commands the torque and/or power to the M/G 14, and friction brakes 38. The friction brakes 38 are configured to brake the vehicle 10 via friction braking (e.g., via a brake pad engaging a rotor or brake shoes engaging a drum). The controller 32 also controls the timing of gear shifts within the transmission 16.

A command to decrease or reduce the speed of vehicle 10, which may be generated via depressing the brake pedal 36, may include an A-term that corresponds to the amount of friction braking (i.e., braking via the friction brakes 38) and a B-term that corresponds to the amount of regenerative braking (e.g., braking via the M/G 14 operating as a generator to reduce speed of the vehicle). The ratio of the A-term to the B-term may depend on how far or at what rate the brake pedal is being depressed, the capacity of the battery 22 to receive energy, etc. For example, the B-term may be low or phased out to zero if a large brake command is generated (e.g., a full depression of the brake pedal 36 or a quick rate of depression of the brake pedal 36) or if the capacity of the battery 22 to receive charge is low.

The M/G 14 may act as a motor and provide a driving force for the powertrain 12. To drive the vehicle with the M/G 14 the traction battery 22 transmits stored electrical energy through wiring 40 to the power electronics 24 that may include inverter and rectifier circuitry, for example. The inverter circuitry of the power electronics 24 may convert DC voltage from the battery 22 into AC voltage to be used by the M/G 14. The rectifier circuitry of the power electronics 24 may convert AC voltage from the M/G 14 into DC voltage to be stored with the battery 22. The controller 32 commands the power electronics 24 to convert voltage from the battery 22 to an AC voltage provided to the M/G 14 to provide positive or negative torque to the input shaft 18.

The M/G 14 may also act as a generator and convert kinetic energy from the powertrain 12 into electric energy to be stored in the battery 22. More specifically, the M/G 14 may act as a generator during times of regenerative braking in which torque and rotational (or kinetic) energy from the spinning wheels 28 is transferred back through the transmission 16 and is converted into electrical energy for storage in the battery 22. Regenerative braking refers to a scenario where the M/G 14 operates as a generator to both brake the vehicle and recover kinetic energy, which may then be stored in the battery 22.

It should be understood that the vehicle configuration described herein is merely exemplary and is not intended to be limited. Other electric or hybrid electric vehicle configurations should be construed as disclosed herein. Other electric or hybrid vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

In hybrid configurations that include an internal combustion engine such as a gasoline, diesel, or natural gas powered engine, or a fuel cell, the controller 32 may be configured to control various parameters of such an internal combustion engine. Representative examples of internal combustion parameters, systems, and/or components that may be directly or indirectly actuated using control logic and/or algorithms executed by the controller 32 include fuel injection timing, rate, and duration, throttle valve position, spark plug ignition timing (for spark-ignition engines), intake/exhaust valve timing and duration, etc. Sensors communicating input through the I/O interface from such an internal combustion engine to the controller 32 may be used to indicate turbocharger boost pressure, crankshaft position (PIP), engine rotational speed (RPM), intake manifold pressure (MAP), throttle valve position (TP), exhaust gas oxygen (EGO) or other exhaust gas component amount or presence, intake air flow (MAF), etc.

It should be understood that the schematic illustrated in FIG. 1 is merely representative and is not intended to be limiting. Other configurations are contemplated without deviating from the scope of the disclosure. For example, the vehicle powertrain 12 may be configured to deliver power and torque to the one or both of the front wheels as opposed to the illustrated rear wheels 28.

Figure 2:
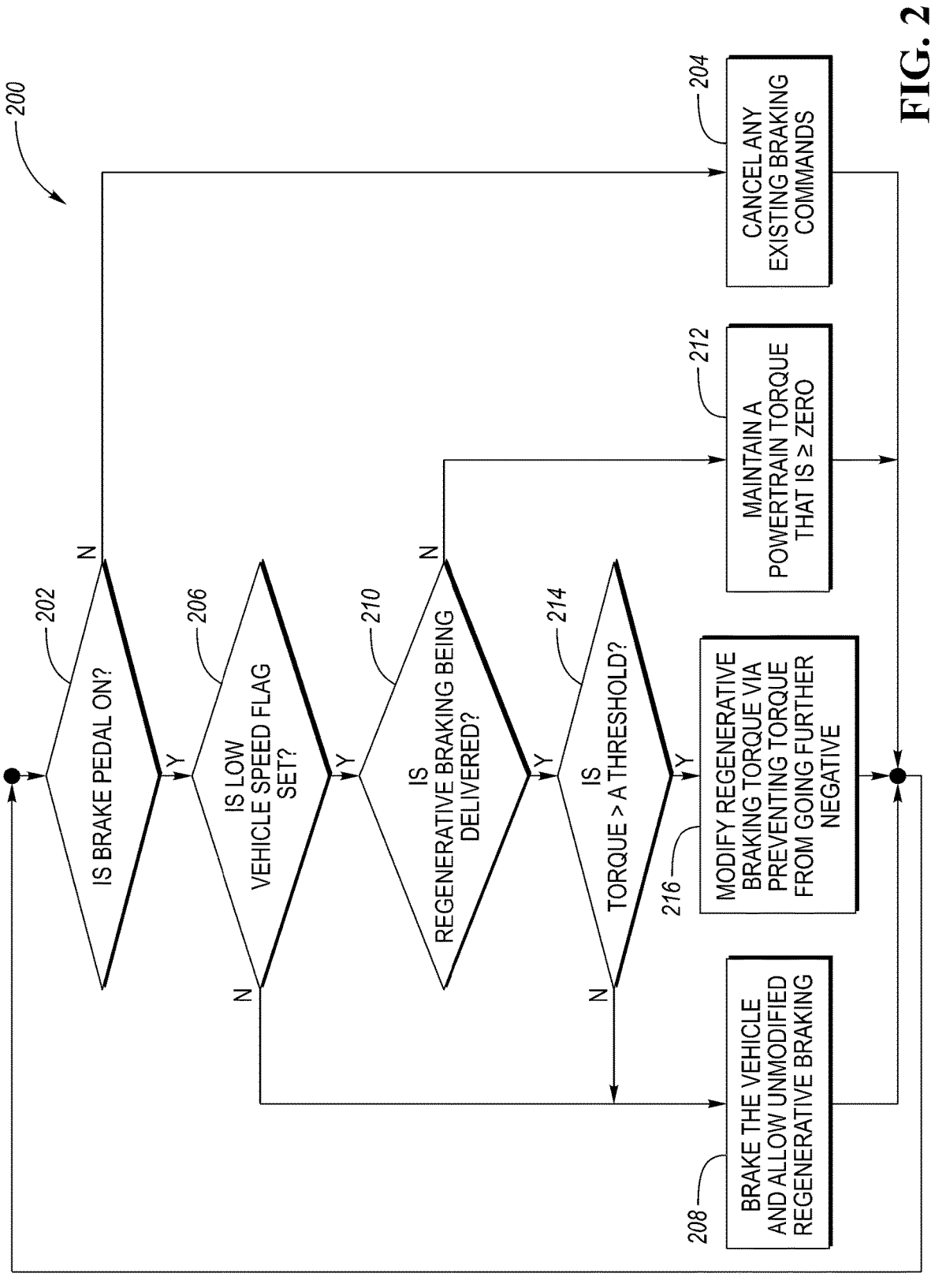
FIG. 2 is a flowchart illustrating a method for controlling regenerative braking in the electric vehicle.

Referring to FIG. 2, a flowchart of a method 200 for controlling regenerative braking in the vehicle 10 is illustrated. The flowchart may correspond to braking events of the vehicle 10. The method 200 may be stored as control logic and/or an algorithm within the controller 32. The controller 32 may implement the method 200 by controlling the various components of the vehicle 10. The method begins at block 202 where it is determined if the brake pedal 36 is on (e.g., if the brake pedal 36 being depressed such that a brake command is generated by the controller 32). If brake pedal 36 is not on (e.g., if the brake pedal 36 is not being depressed such that no brake command is generated) the method 200 moves on to block 204, where any existing braking commands (e.g., a friction braking command to the friction brakes 38 and/or a regenerative braking command to the M/G 14) are cancelled. Also, a regenerative braking command can be generated in response to the accelerator pedal 34 being at a sufficiently low position. The method 200 then returns to block 202.

Returning to block 202, if the brake pedal 36 is on, the method 200 moves on to block 206 where it is determined if a low vehicle speed flag has been set. The low vehicle speed flag may correspond to vehicle speed being less than a threshold or less than a threshold plus a hysteresis value, which is further discussed below with respect to FIG. 3. If the low vehicle speed flag has not been set, the method 200 moves on to block 208 where a command is generated to brake the vehicle 10 and regenerative braking is unmodified. More specifically at block 208, (i) the M/G 14 may brake the vehicle 10 via regenerative braking alone, (ii) the friction brakes 38 may brake the vehicle 10 via friction braking alone, or (iii) the vehicle 10 may be braked via a combination of regenerative braking via the M/G 14 and friction braking via the friction brakes 38 depending on the desired A-term and the B-term described above. The method 200 then returns to block 202.

Returning to block 206, if it is determined that the low vehicle speed flag has been set, the method 200 moves on to block 210 where it is determined if regenerative braking is being delivered (e.g., is the M/G 14 braking the vehicle 10).

If regenerative braking is not being delivered, the method 200 moves on to block 212 where the torque being delivered through the powertrain 12 (e.g., the torque generated by the M/G 14) is maintained at a value that is greater than or equal to zero (i.e., a zero or positive torque value is maintained) to prevent a lash crossing event within the powertrain 12 during the braking event. The friction brakes 38 will provide all of the braking force during a braking event that ends up at block 212. The method 200 then returns to block 202.

It is noted that a positive torque value may correspond to the powertrain 12 outputting torque (e.g., the M/G 14 is operating as a motor to generate torque to propel the vehicle 10) while a negative torque value may correspond to the powertrain 12 receiving or absorbing torque (e.g., the M/G 14 is operating as a generator to perform a regenerative braking operation in order to absorb kinetic energy to recharge the battery). Therefore, an increase in regenerative braking torque may correspond to a decrease in negative torque values but an increase in absolute torque values.

Returning to block 210, if it is determined that regenerative braking is being delivered the method 200 moves on to block 214 where it is determined if the torque of the powertrain 12 is greater than a threshold. If the torque of the powertrain 12 is not greater than the threshold, the method 200 moves on to block 208. If it is determined that the torque being delivered through the powertrain 12 (e.g., the torque generated or received by the M/G 14) is greater than the threshold, the powertrain is close to a lash crossing event and the method 200 moves on to block 216 where the torque being delivered through the powertrain 12 (e.g., the torque generated or received by the M/G 14) is prevented from going further negative (e.g., regenerative torque as an absolute value is modified and cannot be increased) during the braking event. The method 200 then returns to block 202.

Figure 3:
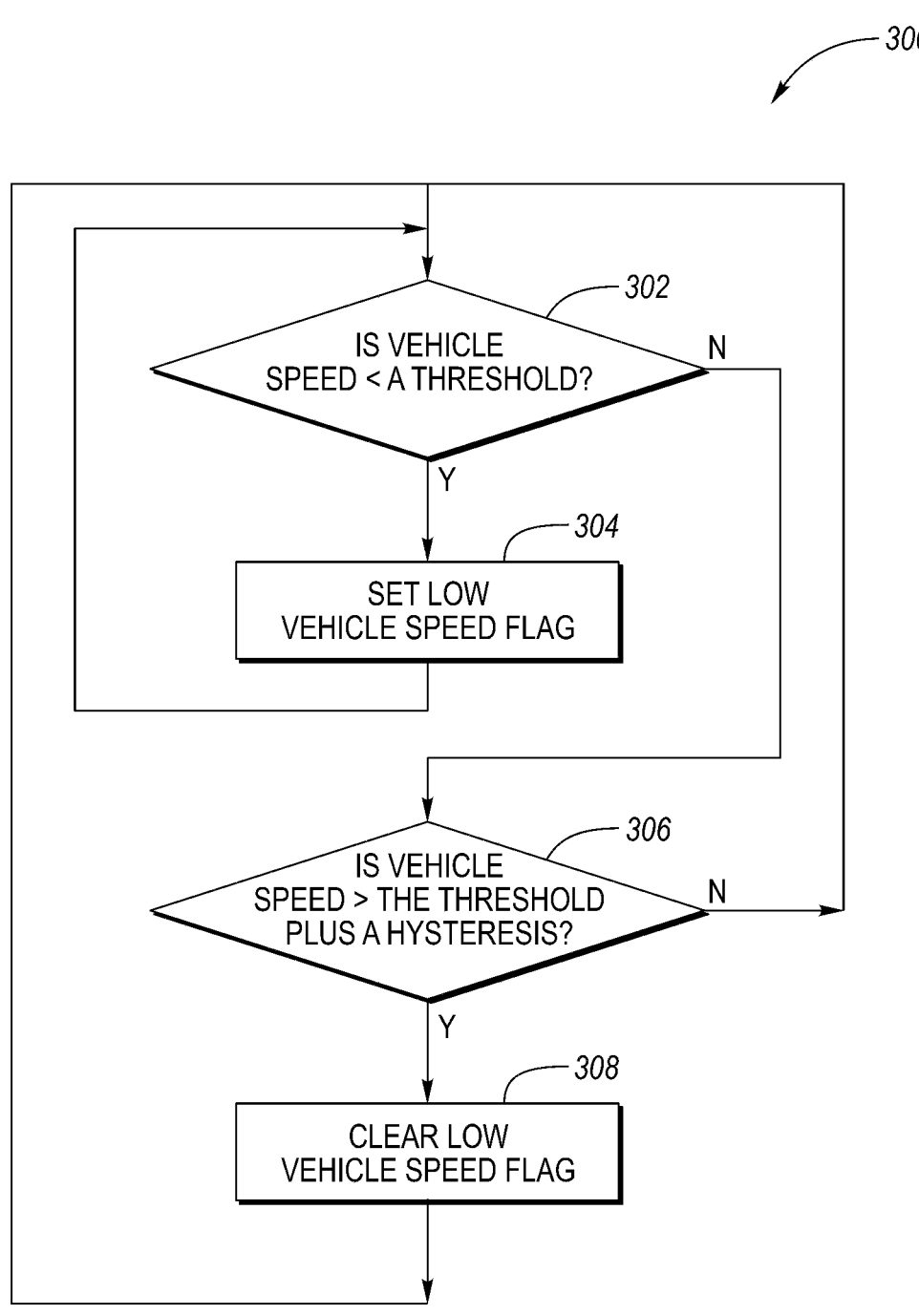
FIG. 3 is a flowchart illustrating a method for setting a low vehicle speed flag, which is utilized as an input to the method illustrated in FIG. 2.

Referring to FIG. 3, a flowchart of a method 300 for setting the low vehicle speed flag at block 206 in FIG. 2 is illustrated. The method 300 may be stored as control logic and/or an algorithm within the controller 32. The controller 32 may implement the method 300 by controlling the various components of the vehicle 10. The method 300 begins at block 302 where it is determined if the speed of the vehicle 10 is less than a threshold. If the speed of the vehicle is less than the threshold the method 300 moves on to block 304, where the low vehicle speed flag is set, the method 300 then returns to block 302. If the speed of the vehicle is not less than the threshold the method 300 moves on to block 306, where it is determined if the speed of the vehicle 10 is greater than the threshold plus a hysteresis ((e.g., the threshold from block 302 plus an offset value). If the speed of the vehicle 10 is not greater than the threshold plus the hysteresis, the method 300 returns to block 302. If the speed of the vehicle 10 is greater than the threshold plus the hysteresis, the method 300 moves on to block 308, where the low vehicle speed flag is cleared. The method 300 then returns to block 302.

A first use case scenario may correspond to the controller 32 generating a first command to reduce the speed of the vehicle 10 (e.g., via depressing the brake pedal 36) and generating a second command to reduce the speed of the vehicle 10 (e.g., via depressing the brake pedal 36) that is subsequent to the first command, where (i) an intermediary event interrupted the first command to reduce the speed of the vehicle 10, (ii) the intermediary event is subsequent to first command to reduce the speed of the vehicle 10, and (iii) the intermediary event is prior to the second command to reduce the speed of the vehicle 10. Under the first use case scenario, the first command to reduce the speed of the vehicle 10 resulted in an unmodified regenerative braking command at block 208 while the second command to reduce the speed of the vehicle 10 resulted in a modified regenerative braking command at block 216. The braking event that results from the first command to reduce the speed of the vehicle 10 may include regenerative braking only or a combination of regenerative braking and friction braking.

The intermediary event under the first use case scenario may correspond to releasing the brake pedal 36 and/or an increase in a torque of the M/G 14 from a first negative value during the first command to a second negative value subsequent to the first command, which may be caused by an introduction or an increase in creep torque and/or a reduction in regenerative braking torque that resulted from releasing the brake pedal 36. An absolute value of the first negative value may be greater than an absolute value of the second negative value since the increase in the torque of the M/G 14 from the first negative value to the second negative may correspond to a reduction in regenerative braking torque. Finally, under the first use case scenario, regenerative braking torque may be limited to the second negative value (e.g., the regenerative braking toque may be limited to values between the second negative value and zero) during the braking event that results from the second command to reduce the speed of the vehicle 10. More specifically, the braking event that results from the second command to reduce the speed of the vehicle 10 may include friction braking only or a combination of regenerative braking and friction braking where the regenerative braking in limited to the second negative value.

A second use case scenario may correspond to the controller 32 generating a first command to reduce the speed of the vehicle 10 (e.g., via depressing the brake pedal 36) and generating a second command to reduce the speed of the vehicle 10 (e.g., via depressing the brake pedal 36) that is subsequent to the first command, where (i) an intermediary event interrupted the first command to reduce the speed of the vehicle 10, (ii) the intermediary event is subsequent to first command to reduce the speed of the vehicle 10, and (iii) the intermediary event is prior to the second command to reduce the speed of the vehicle 10. Under the second use case scenario, the first command to reduce the speed of the vehicle 10 resulted in an unmodified regenerative braking command at block 208 while the second command to reduce the speed of the vehicle 10 resulted in a modified regenerative braking command at block 216. The braking event that results from the first command to reduce the speed of the vehicle 10 may include regenerative braking only or a combination of regenerative braking and friction braking.

The intermediary event under the second use case scenario may correspond to releasing the brake pedal 36 and/or an increase in a torque of the M/G 14 from a negative value during the first command to a zero or positive value subsequent to the first command, which may be caused by an introduction or an increase in creep torque and/or a reduction in regenerative braking torque that resulted from releasing the brake pedal 36. Finally, under the second use case scenario, regenerative braking may be controlled torque to zero (e.g., the toque of the M/G 14 may be zero or positive) to prevent a lash crossing and the speed of the vehicle 10 may be reduced via friction braking only during the braking event that results from the second command to reduce the speed of the vehicle 10.

Once the low vehicle speed flag has been set at block 206 and once regenerative braking torque has been modified at block 216 or has been eliminated at block 212, the method 200 will continue to either move on to block 212 where no regenerative braking is applied or will move onto block 216 where the torque being delivered through the powertrain 12 (e.g., the torque generated by the M/G 14) is prevented from going further negative (e.g., regenerative torque as an absolute value is modified and cannot be increased) until the low vehicle speed flag has been cleared. Clearing the low vehicle speed flag requires an increase in the speed of the vehicle to greater than the threshold plus the hysteresis value at block 306. The method 200 may be prevented from moving on to block 208 once the low vehicle speed flag has been set at block 206 and once regenerative braking torque has been modified at block 216 or has been eliminated at block 212.

The low vehicle speed flag may remain or may be cleared under the first use case scenario. If there is an increase in vehicle speed subsequent to the second command to reduce the speed of the vehicle 10 followed by a third command to reduce the speed of the vehicle under the first case use scenario, the braking event that results from the third command to reduce the speed of the vehicle 10 may include friction braking only or a combination of regenerative braking and friction braking where the regenerative braking is limited to the second negative value (e.g., the method 200 is prevented from returning to block 208) if the low vehicle speed flag was not cleared by the increase in vehicle speed that was subsequent to the second command (i.e., if the increase in vehicle speed was less than the threshold plus the hysteresis). On the other hand, the braking event that results from the third command to reduce the speed of the vehicle under the first case use scenario may include regenerative braking or a combination of regenerative braking and friction braking (e.g., the method 200 may return to block 208) if the low vehicle speed flag was cleared by the increase in vehicle speed that was subsequent to the second command (i.e., if the increase in vehicle speed was greater than the threshold plus the hysteresis).

The low vehicle speed flag may remain or may be cleared under the second use case scenario. If there is an increase in vehicle speed subsequent to the second command to reduce the speed of the vehicle 10 followed by a third command to reduce the speed of the vehicle under the second use case scenario, the braking event that results from the third command to reduce the speed of the vehicle 10 may include friction braking only (e.g., the method 200 is prevented from returning to block 208) if the low vehicle speed flag was not cleared by the increase in vehicle speed that was subsequent to the second command (i.e., if the increase in vehicle speed was less than the threshold plus the hysteresis). On the other hand, the braking event that results from the third command to reduce the speed of the vehicle under the second case use scenario may include regenerative braking or a combination of regenerative braking and friction braking (e.g., the method 200 may return to block 208) if the low vehicle speed flag was cleared by the increase in vehicle speed that was subsequent to the second command (i.e., if the increase in vehicle speed was greater than the threshold plus the hysteresis).

A third use case scenario may correspond to the controller 32 generating a single command to reduce the speed of the vehicle 10 (e.g., via depressing the brake pedal 36), where an intermediary event does not interrupt the single command to reduce the speed of the vehicle 10 (e.g., the brake pedal 36 is not released or there is not increase in torque to greater than the threshold at block 214). Under the third use case scenario, the single command to reduce the speed of the vehicle 10 may result in an unmodified regenerative braking command at block 208, where regenerative braking is utilized to slow the vehicle to a speed of substantially zero.

Such a scenario where regenerative braking is utilized to slow the vehicle to a speed of substantially zero may correspond to when there is an absence of releasing the brake pedal 36. A speed of substantially zero may refer to any incremental speed value that is between one mile/hour and zero miles/hour.

A fourth use case scenario may include (i) an increase in vehicle speed that is greater than the threshold plus the hysteresis resulting in clearing the low vehicle speed flag (clearing the low vehicle speed flag subsequent to the second command to reduce the speed of the vehicle 10 under ether the first or second use case scenario), (ii) depressing the brake pedal to generate a command to reduce the speed of the vehicle (e.g., depressing the brake pedal to generate a third command subsequent to clearing the low vehicle speed flag under ether the first or second use case scenario), and (iii) a continued increase in vehicle speed due to the vehicle being positioned on a sloped surface during the third command. Under the fourth use case scenario, the controller 32 may be programed to reduce a rate at which regenerative braking increases.

This solution described herein provides several advantages. For Example, there are significant efficiency and drivability advantages (e.g., recovery of additional energy) to allowing regenerative braking down to zero speed or approximately zero speed as opposed to current systems which eliminate regenerative braking at low speeds. The main drawback to performing regenerative braking at very low speed without the hysteresis described herein is demonstrated when the driver has a change-of-mind. Coming off the brake pedal (i.e., releasing the brake pedal 36) and back on again (i.e., depressing the brake pedal 36) at speeds low enough for positive creep torque may induce two lash crossing events (e.g., a first lash crossing where powertrain torque transitions from negative torque to positive torque and a second lash crossing where powertrain torque transitions from positive torque to negative torque). In particular, the second lash crossing event, when the driver comes back on the brake pedal may be problematic. It requires a fast response time from the system at a moment when the powertrain response rate may not be able to perform such a fast response. Again, current systems evade this by eliminating regenerative braking at low speeds. By using the hysteresis, we can get all the benefits described above (e.g., regenerative braking down to zero speed or approximately zero speed) while evading the drawbacks associated with changes-of-mind at low speed (e.g., causing several lash crossing events which affects drivability and response time).

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed. The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
an electric machine configured to brake the vehicle via regenerative braking;
friction brakes configured to brake the vehicle via friction braking;
a brake pedal configured to generate commands to reduce a speed of the vehicle via regenerative braking or friction braking; and
a controller programmed to,
  in response to depressing the brake pedal to generate a first command to reduce the speed of the vehicle, reduce the speed of the vehicle (i) via regenerative braking or (ii) via regenerative braking plus friction braking,
  in response to (i) releasing the brake pedal subsequent to the first command, (ii) the speed of the vehicle being less than a threshold, and (iii) depressing the brake pedal to generate a second command to reduce the speed of the vehicle subsequent to releasing the brake pedal, reduce the speed of the vehicle via friction braking only; and
  in response to (i) the depressing of the brake pedal to generate the second command to reduce the speed of the vehicle subsequent to releasing the brake pedal and (ii) torque of the electric machine increasing from a first negative value to a second negative value while the brake pedal was released, limit torque of the electric machine to greater than or equal to the second negative value during the second command.

2. The vehicle of claim 1, wherein the controller is further programmed to, in response to (i) an increase in vehicle speed that is less than the threshold plus a hysteresis subsequent to the second command and (ii) depressing the brake pedal to generate a third command to reduce the speed of the vehicle subsequent to the increase in vehicle speed, reduce the speed of the vehicle via friction braking only.

3. The vehicle of claim 1, wherein the controller is further programmed to, in response to (i) an increase in vehicle speed that is greater than the threshold plus a hysteresis subsequent to the second command and (ii) depressing the brake pedal to generate a third command to reduce the speed of the vehicle subsequent to the increase in vehicle speed, reduce the speed of the vehicle (i) via regenerative braking or (ii) via regenerative braking plus friction braking.

4. The vehicle of claim 1, wherein the controller is further programmed to, in response to (i) the depressing of the brake pedal to generate the second command to reduce the speed of the vehicle subsequent to releasing the brake pedal and (ii) torque of the electric machine increasing from a negative value to zero or a positive value while the brake pedal was released, limit torque of the electric machine to greater than or equal to zero during the second command.

5. The vehicle of claim 1, wherein the controller is further programmed to in response to (i) an increase in vehicle speed that is greater than the threshold plus a hysteresis subsequent to the second command, (ii) depressing the brake pedal to generate a third command to reduce the speed of the vehicle subsequent to the increase in vehicle speed, and (iii)

a continued increase in vehicle speed due to the vehicle being positioned on a sloped surface during the third command, control an increase in regenerative braking.

6. A vehicle comprising:
an electric machine configured to brake the vehicle via regenerative braking;
friction brakes configured to brake the vehicle via friction braking; and
a controller programmed to,
  in response to a first command to reduce a speed of the vehicle, reduce the speed of the vehicle (i) via regenerative braking, and
  in response to (i) an increase in torque of the electric machine from a first negative value during the first command to a second negative value subsequent to the first command, (ii) the speed of the vehicle being less than a threshold, and (iii) a second command to reduce the speed of the vehicle subsequent to the increase in torque of the electric machine from the first negative value to the second negative value, limit regenerative braking torque to the second negative value and reduce the speed of the vehicle (i) via friction braking or (ii) via friction braking plus regenerative braking.

7. The vehicle of claim 6, wherein the controller is further programmed to, in response to (i) an increase in torque of the electric machine from the first negative value during the first command to a zero or positive value subsequent to the first command, (ii) the speed of the vehicle being less than the threshold, and (iii) a third command to reduce the speed of the vehicle subsequent to the increase in torque of the electric machine from the first negative value to the zero or positive value, control regenerative braking torque to zero and reduce the speed of the vehicle via friction braking only.

8. The vehicle of claim 6, wherein the controller is further programmed to, in response to (i) an increase in vehicle speed that is less than the threshold plus a hysteresis subsequent to the second command and (ii) a third command to reduce the speed of the vehicle subsequent to the increase in vehicle speed, reduce the speed of the vehicle (i) via friction braking or (ii) via friction braking plus regenerative braking.

9. The vehicle of claim 6, wherein the controller is further programmed to, in response to (i) an increase in vehicle speed that is greater than the threshold plus a hysteresis subsequent to the second command and (ii) a third command to reduce the speed of the vehicle subsequent to the increase in vehicle speed, reduce the speed of the vehicle (i) via regenerative braking or (ii) via regenerative braking plus friction braking.

10. The vehicle of claim 6, wherein an absolute value of the first negative value is greater than an absolute value of the second negative value.

11. The vehicle of claim 6, wherein the controller is further programmed to, in response to (i) an increase in vehicle speed that is greater than the threshold plus a hysteresis subsequent to the second command, (ii) a third command to reduce the speed of the vehicle subsequent to the increase in vehicle speed, and (iii) a continued increase in vehicle speed due to the vehicle being positioned on a sloped surface during the third command, control an increase in regenerative braking.

12. The vehicle of claim 6, wherein the controller further is programmed to, in an absence of releasing a brake pedal during the first command, reduce the speed of the vehicle to substantially zero via regenerative braking during the first command.

13. A vehicle comprising:

an electric machine configured to brake the vehicle via regenerative braking;

friction brakes configured to brake the vehicle via friction braking; and a controller programmed to, in response to a first command to reduce a speed of the vehicle, reduce the speed of the vehicle (i) via regenerative braking, and in response to (i) an increase in torque of the electric machine from a negative value during the first command to a zero or positive value subsequent to the first command, (ii) the speed of the vehicle being less than a threshold, and (iii) a second command to reduce the speed of the vehicle subsequent to the increase in torque of the electric machine from the negative value to the zero or positive value, control regenerative braking torque to zero and reduce the speed of the vehicle via friction braking only;

in response to (i) an increase in torque of the electric machine from the negative value during the first command to a second negative value subsequent to the first command, (ii) the speed of the vehicle being less than the threshold, and (iii) a third command to reduce the speed of the vehicle subsequent to the increase in torque of the electric machine from the negative value to the second negative value, limit regenerative braking torque to the second negative value and reduce the speed of the vehicle (i) via friction braking or (ii) via friction braking plus regenerative braking.

14. The vehicle of claim 13, wherein an absolute value of the negative value is greater than an absolute value of the second negative value.

15. The vehicle of claim 13, wherein the controller is further programmed to, in response to (i) an increase in vehicle speed that is less than the threshold plus a hysteresis subsequent to the second command and (ii) a third command to reduce the speed of the vehicle subsequent to the increase in vehicle speed, reduce the speed of the vehicle via friction braking only.

16. The vehicle of claim 13, wherein the controller is further programmed to, in response to (i) an increase in vehicle speed that is greater than the threshold plus a hysteresis subsequent to the second command and (ii) a third command to reduce the speed of the vehicle subsequent to the increase in vehicle speed, reduce the speed of the vehicle (i) via regenerative braking or (ii) via regenerative braking plus friction braking.

17. The vehicle of claim 13, wherein the controller is further programmed to, in response to (i) an increase in vehicle speed that is greater than the threshold plus a hysteresis subsequent to the second command, (ii) a third command to reduce the speed of the vehicle subsequent to the increase in vehicle speed, and (iii) a continued increase in vehicle speed due to the vehicle being positioned on a sloped surface during the third command, control an increase in regenerative braking.

18. The vehicle of claim 13, wherein the controller further is programmed to, in an absence of releasing a brake pedal, reduce the speed of the vehicle to substantially zero via regenerative braking during the first command.

\* \* \* \* \*